United States Patent [19]

Maeda

[11] Patent Number: 5,155,600
[45] Date of Patent: Oct. 13, 1992

[54] VIDEO DISK PLAYBACK APPARATUS

[75] Inventor: Tetsuo Maeda, Osaka, Japan

[73] Assignee: Matsushita Electric Industrial Co., Ltd., Osaka, Japan

[21] Appl. No.: 401,131

[22] Filed: Aug. 30, 1989

[30] Foreign Application Priority Data

Aug. 30, 1988 [JP] Japan .................. 63-215425

[51] Int. Cl.[5] .............................. H04N 9/79
[52] U.S. Cl. .................. 358/310; 358/335; 358/342; 358/339
[58] Field of Search ............. 358/310, 342, 335, 343, 358/341, 322, 906, 909, 339, 162, 167, 183, 146; 360/18, 39, 33.1, 35.1, 19.1, 27

[56] References Cited

U.S. PATENT DOCUMENTS 4,839,743  6/1989  Best et al. ................ 358/310

Primary Examiner—Dale M. Shaw
Assistant Examiner—Robert Chevalier
Attorney, Agent, or Firm—Wenderoth, Lind & Ponack

[57] ABSTRACT

A video disk playback apparatus for playing back video image information recorded on a disk, such as a laser disk. The information recorded in the disk is read out as playback signals, which are separated into an analog composite video signal, digital data and digital audio data. The analog composite video signal is either directly reproduced as a moving picture, or is converted into digital composite video data and stored in a video data memory. On the other hand, the digital data is converted into digital video data having the same format as the digital composite video data and is stored in the same video data memory as the digital composite video data. The digital data being read out from the disk, such as track number and frame number, are converted into a format that can be recorded into the video data memory, and hence the video data memory for storing the digital composite video data can be shared, so that a memory circuit for the digital video data is not needed. It is also possible to cope with the case of recording a large capacity of digital data such as graphic data and still pictures onto a video disk.

5 Claims, 4 Drawing Sheets

VIDEO DISK PLAYBACK APPARATUS

BACKGROUND OF THE INVENTION

1. Field of the Invention

This invention relates to a video disk playback apparatus for reproducing video image signals recorded on a disk, such as a laser disk.

2. Description of the Prior Art

Recently, as the use of audio-video (AV) related appliances has diversified, the laser disk (LD) or other video disk playback apparatuses are not limited to mere reproduction of video images recorded in the disk, but are modified in various versions for displaying a still picture using a memory, displaying the track number, time, or other information by overlapping on a screen, and others. As further developments, there is a mounting demand for a multifunctional apparatus, such as display of characters, still picture or graphics in addition to the original picture when reproducing from the LD. Referring to two prior patents, the conventional video disk playback apparatus is described below.

The Japanese Patent Publication No. 62-263789 discloses a video disk playback apparatus with a video memory. By applying this technique, the picture during playback can be displayed as a still picture. The Japanese Patent Publication No. 61-77168 discloses, in its FIG. 5, a technique of displaying the track number or time information or the like recorded in the blanking period of the video signal or in the subcode of the CD on the screen by converging into a video signal using a character generator.

Such a constitution, however, requires a digital data memory for displaying the digital data read out from the disk by overlapping on the moving picture read out from the disk or its still picture. (In FIG. 5 of the No. 61-77168 patent, digital data memory is not mentioned, but it is evident that a memory for the portion of the characters to be displayed is required in the block of the character generator.) In particular, if the digital data is large in capacity such as for a graphic picture, it leads to a higher cost.

SUMMARY OF THE INVENTION

It is hence a first object of the invention to realize the function of displaying the digital data read out from a disk by overlapping on a moving picture read out from the disk or its still picture, without adding a digital data memory.

It is a second object of the invention to realize the function of dealing with data of a large capacity such as graphic data, not limiting to additional information such as track number and frame number, as the digital data to be read out from a disk, on the basis of the first object.

To achieve the above objects, the invention presents a video disk playback apparatus for reproducing multiple types of information recorded in a disk which comprises:

a signal read-out circuit for reading out plural pieces of information recorded in a disk as playback signals, a signal separator for separating the playback signals into an analog composite video signal, digital data, and digital audio data, an A/D converter for converting the analog composite video signal into digital composite video data, a digital data converter for converting the digital data into the digital video data which is in the same format as the digital composite video data, a video data memory for storing the digital composite video data and digital video data, and a video processing circuit for converting the data in the video data memory into an analog composite video signal and delivering it.

According to this constitution, the digital data such as track number and frame number being read out from the disk is converted by the digital data converter into a format to be recorded in the video data memory, and therefore it is possible to display by sharing the video data memory for storing the digital composite video data, so that a digital data memory is not needed. Further, since the video data memory generally possesses a capacity to correspond to the full display screen, it is hence possible to accumulate data of a a large capacity such as graphic data and still pictures. As a result, it is possible to realize a program composed of a still picture and sound recorded in a disk not containing a moving picture such as CD, or a multifunctional program using an LD recording the graphic data or still pictures together with moving pictures.

DETAILED DESCRIPTION OF THE PREFERRED EMBODIMENTS

Figure 1:
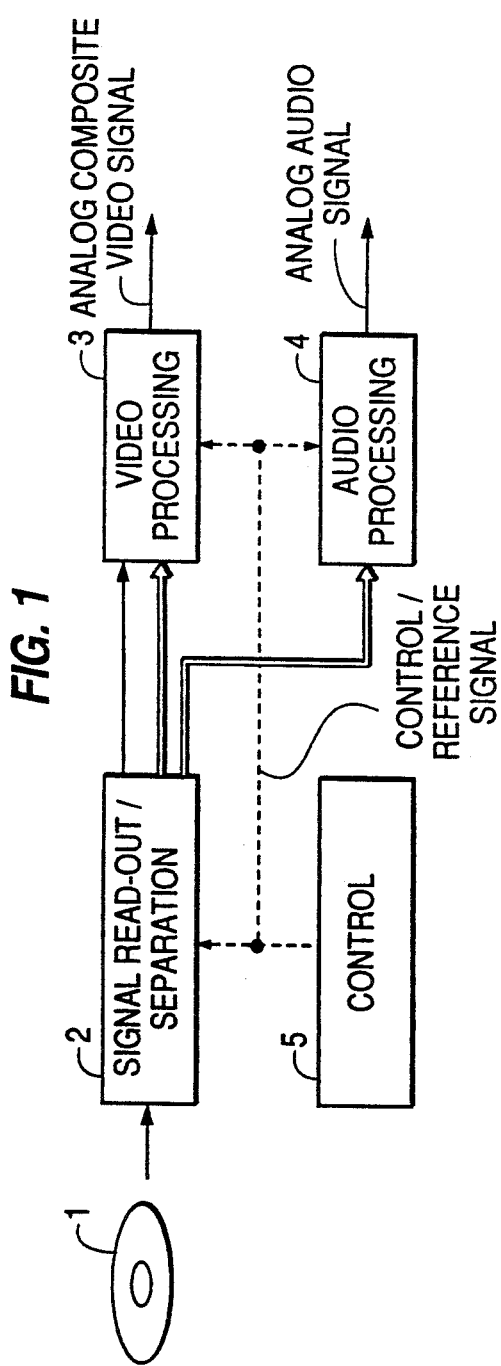
FIG. 1 is a block diagram showing an example of general structure of the video disk playback apparatus of the invention.

Referring now the drawing, an embodiment of the video disk playback apparatus of the invention is described in detail below.

FIG. 1 is a block digram showing an example of the entire structure of the video disk playback apparatus of the invention. In FIG. 1, numeral 1 is a disk such as a LD, and 2 is a signal read-out/separation circuit which reads out plural pieces of information recorded in the disk 1 and separates the read out data into an analog composite video signal, digital data, and digital audio data. Numeral 3 is a video processing section, which is described in detail below. Numeral 4 is an audio processing section which processes the digital audio data as required. Numeral 5 is a control section which supplies necessary control/reference signals to the sections 2 to 4, and controls the entire structure. Examples of control signals are the on/off control of analog audio output in the audio processing section, and setting of special effects for the video processing section 3. Examples of reference signals are the setting signal for the rotating speed of the disk to the signal read-out/separation circuit 2, and horizontal sync signal for the video processing section 3.

Figure 2:
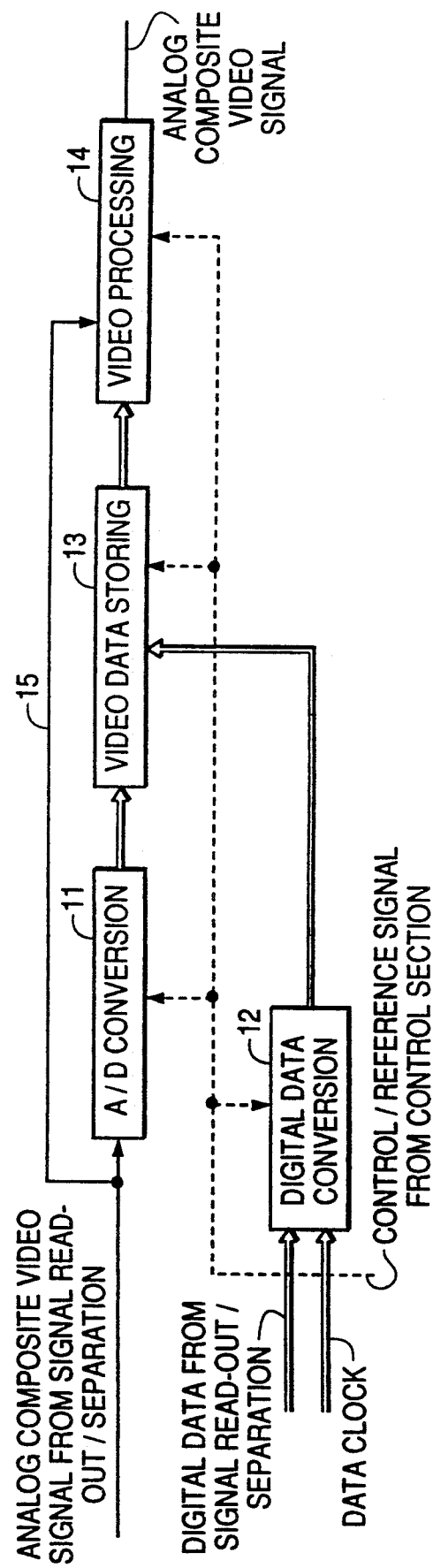
FIG. 2 is a block diagram showing a structural example of the video processing section shown in FIG. 1.

FIG. 2 is a block diagram showing a structural example of the video processing section 3 shown in FIG. 1. In FIG. 2, numeral 11 is an A/D converter for converting the analog composite video signal into digital composite video data, 12 is a digital data converter for converting the digital data into digital video data having the same data format as the digital composite video data, 13 is a video data memory for accumulating the digital composite video data and digital video data, 14 is a video processing circuit for reading out the data from the video data memory, converting the read out data into an analog composite video signal, and delivering it, and 15 is a signal path for directly reproducing the analog composite video signal being read out from the disk, without passing through the video data memory in the usual playback operation.

The operation of thus composed embodiment of the video disk playback apparatus of the invention is described below.

First, the signal read-out/separation circuit 2 reads out a playback signal from the disk, and separates it into an analog composite video signal, digital data, and digital audio data. In this example, it is assumed that the digital data is recorded in an RGB format in a part of (for example, lower 2 bits of) the digital audio signal of the LD. In the usual playback, the analog composite video signal is reproduced as a moving picture as being sent directly into the video processing circuit 14 via the signal path 15 shown in FIG. 2. When capturing the image as a still picture, according to an instruction from the control section 5, the A/D converter 11 converts the analog composite video signal into digital composite video data, and accumulates it in the video data memory 13. If display of this image is needed, the data read out from the video data memory is sent into the video processing circuit 14, and is converted into analog composite video signal, and delivered. On the other hand, the digital data is converted by the digital data converter 12 into digital video data having the same data format as the digital composite video data, and is written into the video data memory 13 as required, and is read out as data the same as the digital composite video data, and is sent into the video processing circuit 14.

Figure 3:
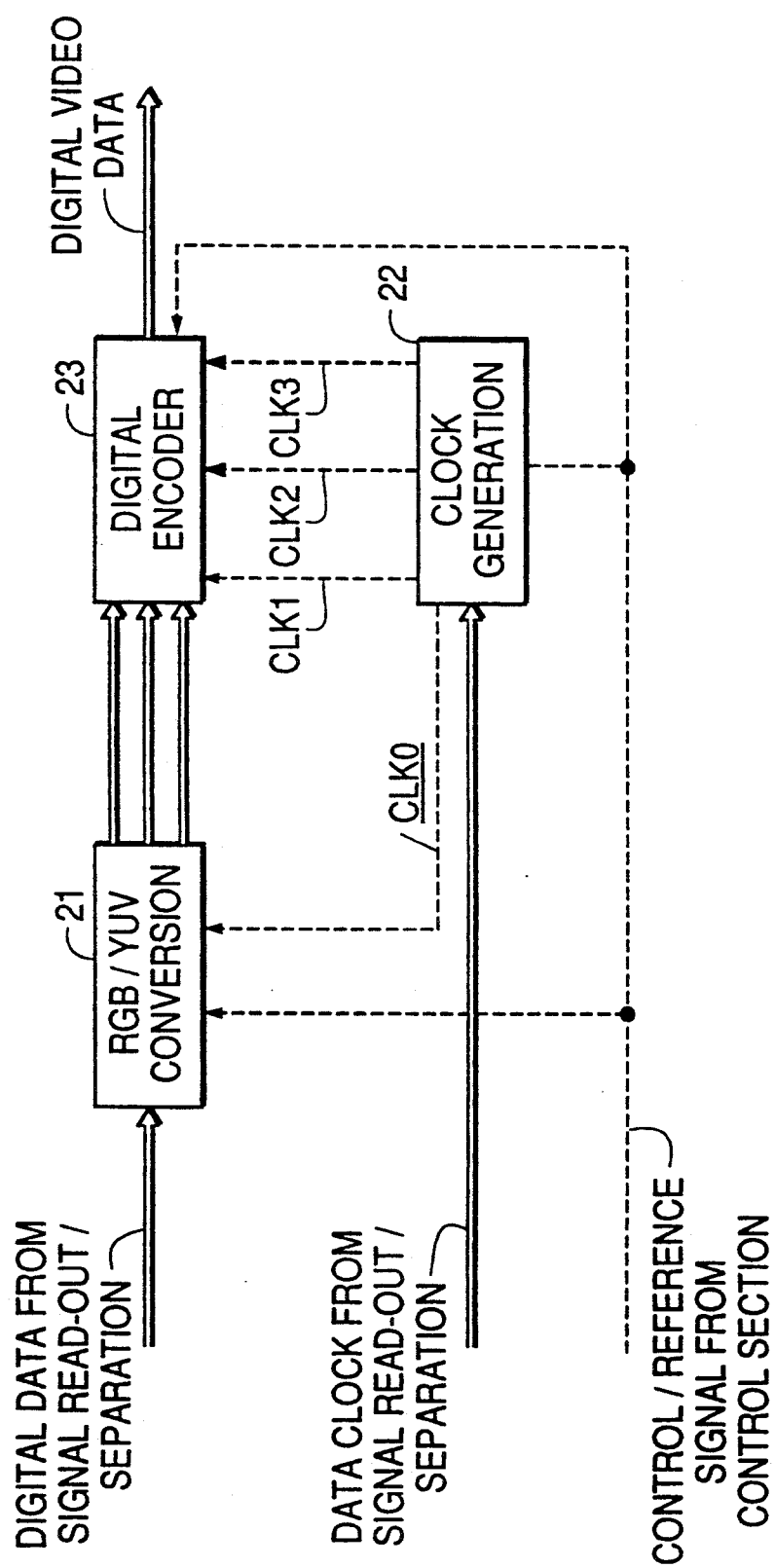
FIG. 3 is a block diagram showing a practical structural example of the digital data converter shown in FIG. 2.
Figure 4:
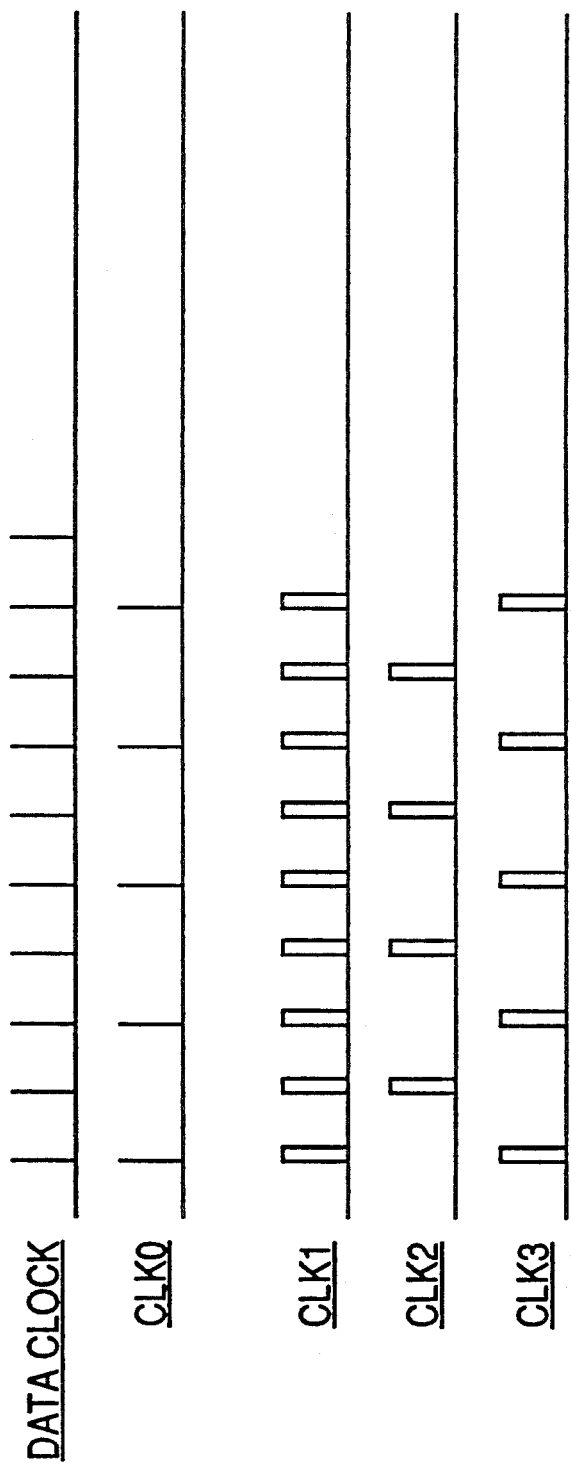
FIG. 4 is a timing chart of each clock shown in FIG. 3.

FIG. 3 is a block diagram showing a practical structural example of the digital data converter 12 shown in FIG. 2. In FIG. 3, numeral 21 is an RGB/YUV conversion circuit for converting the digital data sent from the signal read-out/separation circuit 2 into YUV data, 22 is a clock generator for generating CLK0 for determining the RGB/YUV conversion timing on the basis of the data clock from the signal read-out/separation circuit 2, CLK1 for determining the addition timing of the Y signal, CLK2 for determining the addition timing of U signal, and CLK3 for determining the addition timing of the V signal, and 23 is a digital encoding circuit for adding Y, U, V data at every clock, and delivering digital video data. This digital video data has the same data format as the analog composite video signal sampled at 4 fsc. The data clock sent out from the signal read-out/separation circuit 2 is synchronized with the digital data, and its period is ½ of the period of the change of the digital data. In FIG. 3, the video image recorded in the digital data sent out from the signal read-out/separation circuit 2 is produced or sampled at a resolution of 2 fsc. FIG. 4 is a timing chart for showing the relative relation of the data clock and individual clocks.

In the thus composed structural example of the digital data conversion circuit, the operation is described below. The digital data sent out from the signal read-out/separation circuit 2 is fed into the RGB/YUV conversion circuit 21. The digital data is, in this example, 24 bits wide (8 bits each for R, G, B), and is read into the RGB/YUV conversion circuit 21 at CLK0, and is converted into Y data, U data, V data, and delivered. The digital encoding circuit 23 latches the Y data, U data, V data at the rise of CLK1, CLK2, CLK3, respectively, and adds at their fall. The digital video data delivered from the digital encoding circuit 23 is sent into the video data memory in FIG. 2, and is written into the address specified from the control section 5.

Examples of the conversion formulas of the RGB/YUV conversion circuit 22 are shown below.

$$Y = 0.299 \times R + 0.587 \times G + 0.114 \times B$$

$$U = 0.564 \times (B - Y)$$

$$V = 0.713 \times (R - Y)$$

Meanwhile, the video data memory 13 may be easily composed by using a tri-port memory chip having a serial input port, serial output port and random access port that has recently been widely employed. In this case, the input of digital composite video data is written in the serial input port, the output of the digital composite video data from the serial output port, and the input of digital data into the random access port.

Thus, according to this embodiment, having the digital data conversion circuit 13, since the digital data read out from the disk is converted into digital video data having the same data format as the digital composite video data, the video data memory can be commonly used for its accumulation. As a result, 1) the digital data memory is not needed, and 2) it is possible to deal with a large capacity of data such as graphic data.

Figure 5:
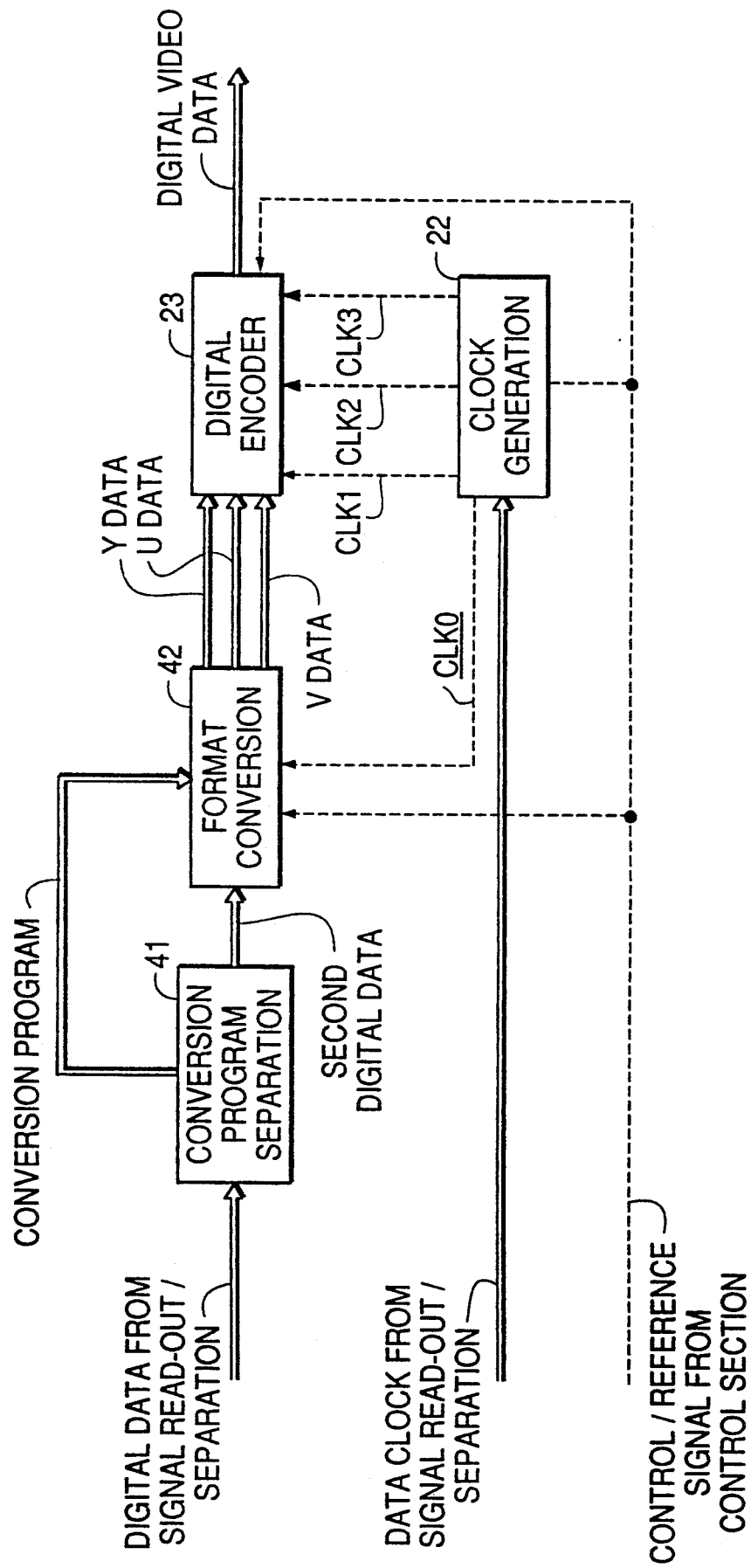
FIG. 5 is a block diagram showing another structural example of the digital data converter shown in FIG. 2.

FIG. 5 is a block diagram showing other structural example of digital data conversion circuit 12, in which numeral 41 is a conversion program separation circuit for converting the digital data set out from the signal read-out/separation circuit 2 into a conversion program and second digital data, and 42 is a format conversion circuit for converting the second digital data into YUV data in a method specified in the conversion program. Numerals 22 and 23 are the same as shown in FIG. 3. By thus composing, it is possible to record the program for defining the conversion formula of the digital data conversion circuit in the disk without incorporating the same into the apparatus, and execute the conversion according to the program being read in, and even with the same apparatus, a superior conversion method developed later can be used, and the degree of flexibility of the apparatus can be enhanced.

Meanwhile, the digital data can be also recorded in the blanking period or subcode of the analog composite video signal of the LD. In the embodiment of FIG. 3, the digital data is assumed to be RGB format, but it may be also, possible to record in other data format, such as the YUV format. In this case, the RGB/YUV conversion circuit is not needed. Further, the coordinates on the display screen of the digital video data may be held within the digital data, instead of being instructed from the control section 5. In this case, the actual address for writing the digital video data into the video data memory is calculated from the coordinates. In FIG. 2, after separating the analog composite video signal into luminance and chrominance, A/D conversion is effected, and the digital video luminance data and digital video chrominance data are obtained, and the video data memory is modified into a type for accumulating them, and accordingly the digital data are converted into digital luminance data and digital chrominance data having the same data format as the digital video luminance data and digital video chrominance data respectively, and they are accumulated in the video data memory, so that the quality of the video image may be enhanced, thereby realizing a playback apparatus having excellent special effect video image function.

We claim:

1. A video disk playback apparatus for reproducing plural types of information recorded on a disk, comprising:

means for reading plural pieces of information recorded on the disk as playback signals, means for separating the playback signals into a first analog video signal, digital data, and digital audio data, means for converting the first analog video signal into first digital video data, means for converting the digital data into second digital video data having the same data format as the first digital video data, means for accumulating the first digital video data and the second digital video data, and means for processing and converting the data accumulated in the accumulating means into a second analog video signal and outputting the second analog video signal.

2. A video disk playback apparatus for reproducing plural types of information recorded on a disk, comprising:

means for reading plural pieces of information recorded on the disk as playback signals, means for separating the playback signals into a first analog composite video signal, digital data and digital audio data, first means for converting the first analog composite video signal into digital composite video data, second means for converting the digital data into digital video data having the same data format as the digital composite video data, means for accumulating the digital composite video data and digital video data, and means for processing and converting the data accumulated in the accumulating means into a second analog composite video signal and outputting the second analog composite video signal.

3. A video disk playback apparatus according to claim 2 wherein:

said separating means includes means for further separating the playback signals into an analog video luminance signal and an analog video chrominance signal, said first converting means includes means for converting the analog luminance signal and analog chrominance signal into digital video luminance data and digital video chrominance data, respectively, said second converting means includes means for converting the digital data into digital luminance data and digital chrominance data having the same data format as the digital video luminance data and digital video chrominance data, and said accumulating means includes means for accumulating the digital video luminance data, digital video chrominance data, digital luminance data, and digital chrominance data.

4. A video disk playback apparatus for reproducing plural types of information recorded on a disk, comprising:

means for reading plural pieces of information recorded on the disk as playback signals, means for separating the playback signals into a first analog composite video signal, digital data and digital audio data, first means for converting the first analog composite video signal into digital composite video data, means for separating the digital data into conversion function data and second digital data, second means for converting the second digital data into digital video data having the same data format as the digital composite video data using a method defined by a conversion function of the conversion function data, means for accumulating the digital composite video data and digital video data, and means for processing and converting the data accumulated in the accumulating means into a second analog composite video signal and outputting the second analog composite video signal.

5. A video disk playback apparatus according to claim 4 wherein:

said separating means includes means for further separating the playback signals into an analog video luminance signal and an analog video chrominance signal, said first converting means includes means for converting the analog luminance signal and analog chrominance signal into digital video luminance data and digital video chrominance data, respectively, said second converting means includes means for converting the digital data into digital luminance data and digital chrominance data having the same data format as the digital video luminance data and digital video chrominance data, and said accumulating means includes means for accumulating the digital video luminance data, digital video chrominance data, digital luminance data, and digital chrominance data.

* * * * *